United States Patent [19]
Wolosen et al.

[11] Patent Number: 5,434,214
[45] Date of Patent: Jul. 18, 1995

[54] SILICONE VANE DAMPENING COMPOUND WITH IMPROVED ADHESION

[75] Inventors: Mark Wolosen, Schaghticoke, N.Y.; Alfred A. DeCato, Vernon, Conn.

[73] Assignee: Loctite Corporation, Newington, Conn.

[21] Appl. No.: 259,382

[22] Filed: Jun. 14, 1994

[51] Int. Cl.$^6$ .......................................... C08K 5/3432
[52] U.S. Cl. ................... 524/720; 524/730; 524/773; 427/553
[58] Field of Search ........ 524/720, 730, 773; 427/553

[56] References Cited

U.S. PATENT DOCUMENTS

| | | |
|---|---|---|
| 3,882,083 | 5/1975 | Berger et al. |
| 4,061,609 | 12/1977 | Bobear |
| 4,256,870 | 3/1981 | Eckberg |
| 4,262,107 | 4/1981 | Eckberg |
| 4,340,647 | 7/1982 | Eckberg |
| 4,347,346 | 8/1982 | Eckberg |
| 4,465,818 | 8/1984 | Shirahata et al. |
| 4,476,166 | 10/1984 | Eckberg |

OTHER PUBLICATIONS

MSDS, Baysilone RTV AC-3035, Mobay, 6 pgs., (Dec. 1990).
Product Information Sheet, Room Temperature Vulcanizing Two Component Rubber "RTV II", Baysilone: Additional Cure Systems (Platinium Catalyzed), 1 pg. (undated).
MSDS, Crystaline Silics (Quartz), U.S. Silica, 4 pgs., (Feb. 1990).
MSDS, Trially Isocyanate, Pfaltz & Bauer, Inc. 3 pgs., (Jan. 1986).
MSDS, Dially Maleate, Pfaltz & Bauer, Inc., 2 pgs. (undated).
MSDS, Kencolor K-21122, Kevelrich Petrochemicals, Inc., 2 pgs. (Dec. 1985).
MSDS, Masil 273-147, PPG Industries, Inc., 2 pgs. (Nov. 1989).
MSDS, LIM 2600A Silicone Rubber Compound, General Electric Co., 5 pgs. (Mar. 1990).
MSDS, KE 1925 Ta Shin-Etsu Chemical Co. Ltd., 2 pgs. (undated).
MSDS, Pluracol V-10, BASF Corp., 4 pgs. (Sep. 1988).
MSDS, Cab-O-Sil, Cabot Corp., 2 pgs. (Nov. 1985).
MSDS, Glycidoxypropyl Trimethoxysilane, Huls America Inc., 4 pgs. (Jan. 1993).
Abstract of U.S. Pat. No. 3,882,083, 1 pg. (Patent Issue Date May 1975).
Abstract of U.S. Pat. No. 4,260,726, 1 pg. (Patent Issue Date Apr. 1981).
Abstracts of U.S. Pat. No. 5,059,649/EP 427236, 1 pg. (Patent Issue Date Oct. 1991).
Abstracts of U.S. Pat. No. 5,122,585/EP 490523, 1 pg. (Patent Issue Date Jun. 1992).
Abstract of U.S. Pat. No. 5,206,329, 1 pg. (Patent Issue Date Apr. 1993).

*Primary Examiner*—Melvyn I. Marquis
*Attorney, Agent, or Firm*—Vidas, Arrett & Steinkraus

[57] ABSTRACT

Vibration dampening hydrosilation cured silicone formulations which cure at room temperature and, after a subsequent heat cure cycle, provide good primerless adhesion to aluminum and titanium substrates and improved adhesion to polymeric composite materials such as polyimide/glass fiber composite materials. The composition includes (a) a polyorganosiloxane having plural alkenyl groups thereon; (b) a polyorganosiloxane having plural silicon hydride groups thereon; (c) a hydrosilation catalyst, and (d) a combination of adhesion promoter compounds including at least one silane adhesion promoter compound; triallyl isocyanurate; and diallyl maleate. Still further improvements to polyimide substrates are provided when a primer is employed or the substrate is treated by a very brief exposure to a flame or to UV irradiation.

23 Claims, No Drawings

SILICONE VANE DAMPENING COMPOUND WITH IMPROVED ADHESION

BACKGROUND OF THE INVENTION

Curable silicone RTV compositions based upon hydrosilation cure of two part mixtures of silicones having ethylenic unsaturation (usually vinyl or allyl) and silicones having silicon hydride groups are well known. Cure of such compositions is catalyzed by platinum compounds. Such compositions cure rapidly at room temperature but provide very little adhesion to most substrates. Such compositions are widely used as release coatings, sealants, and as vibration dampening compounds.

One vibration dampening use of such compositions occurs in jet engines where the compositions are applied to parts which may see temperatures as high as 350° F. in operation. In the course of manufacture of the engine, the composition will be exposed to elevated temperatures, such as a bake cycle, but the composition must be curable at room temperature in order to allow subsequent manufacturing operations to take place before baking. Thus, while it is not critical that the final properties be obtained at room temperature, the composition must cure within a reasonable time at room temperature in order to be suited for this application.

Substrates to which the hydrosilation-cured vibration dampening compound may be applied include: ferrous metals such as steel or stainless steel, aluminum and aluminum alloys, titanium and polymer/fiber composite materials such as Ultem TM, a glass fiber reinforced polyimide sold by General Electric, Plastics Div. In this application it is important that the cured vibration dampening composition have good adhesion to the substrates to which it is bonded. Adhesion is particularly poor with aluminum alloys, titanium and composite materials, and consequently, it has in the past been the practice to carefully clean the substrates with a solvent such as methyl ethyl ketone, ethanol or isopropyl alcohol, and then to apply an adhesion improving primer, for instance a silane/titanate primer such as Dow Corning 1200 Primecoat or Loctite VSI V-06 primer, before applying the vibration dampening compound to the substrate. The use of a primer, however, increases the cost of materials and labor and lengthens manufacturing time. Further, worker exposure to primer solvent or to primer active ingredients is undesirable. Consequently, there is need to provide improved room temperature vulcanizing silicone compositions capable of withstanding temperatures of up to 350° F. which provide better primerless adhesion to at least some of these substrates.

Solving this problem by addition of adhesion promoters to the composition is not a simple matter. For instance it is known to use silanes having hydrolyzable groups and a nonhydrolyzable polar functional group as adhesion promoters for many adhesive formulations. Examples of such materials include 3-methacryloxypropyltrimethoxysilane, vinyltriethoxysilane and 3-aminopropyltriethoxysilane. Some of these materials have been found to provide reasonable improvement in an adhesion to aluminum, aluminum alloys and titanium substrates, when incorporated into known vibration dampening hydrosilation cured RTV formulations but not on plastics. Other materials known to improve adhesion of RTV silicones to substrates, are well known inhibitors of hydrosilation at room temperature.

In U.S. Pat. Nos. 4,256,870; 4,340,647 and 4,476,166, it is disclosed that diallyl maleate is an effective inhibitor at room temperature of precious metal catalyzed hydrosilation cure reactions at levels of 0.1%–0.5% or greater.

In U.S. Pat. No. 3,882,083, it is disclosed that triallyl isocyanurate functions as an inhibitor of room temperature cure of platinum catalyzed hydrosilation cured silicone formulations at levels less than 0.3%.

SUMMARY OF THE INVENTION

The present invention pertains to novel vibration dampening hydrosilation cured silicone formulations which cure at room temperature and, after a subsequent heat cure cycle, provide good primerless adhesion to aluminum and titanium substrates and improved adhesion to polymeric composite materials such as polyimide/glass fiber composite materials. The formulation, includes (a) a polyorganosiloxane having plural alkenyl groups thereon; (b) a polyorganosiloxane having plural silicon hydride groups thereon; and (c) a hydrosilation catalyst, also includes (d) a combination of adhesion promoter compounds including at least one silane adhesion promoter compound, triallyl isocyanurate, and diallyl maleate. Surprisingly, the latter two components of the formulation may be employed at levels which the prior art indicates could prevent room temperature curing of the formulation. Still further improvements to plastic substrates are provided when a primer is employed or the substrate is treated by a very brief exposure to a flame or to UV irradiation.

As a further aspect of the invention UV irradiation of polyimide substrates has been demonstrated to provide improvements in adhesion of hydrosilation cured silicones thereto.

DETAILED DESCRIPTION OF THE INVENTION

The alkenyl functional polyorganosiloxane (a) may be any such compound known in the art of hydrosilation cured formulations. Suitably it is an alkenyl group-containing organopolysiloxane compound comprising at least two siloxane units having the formula (I)

  (I)

wherein $R^1$ denotes a silicon-bonded alkenyl group having from 2 to 4 carbon atoms, inclusive, $R^2$ denotes a silicon bonded substituted or unsubstituted monovalent hydrocarbon group, a has a value of from 1 to 3, preferably 1, b has a value of from 0 to 2 and a+b has a value of from 1 to 3, all values inclusive, any remaining siloxane units in the alkenyl group-containing organopolysiloxane having the formula (II)

  (II)

wherein $R^2$ is as denoted above and x has a value of from 0 to 3, inclusive.

The structure of the alkenyl group-containing organopolysiloxane may be linear, branched chain, cyclic or network. The degree of polymerization is two or greater and the upper limit on this is the degree of polymerization at which polymerization is possible, ordinarily 10,000.

The alkenyl group $R^1$ is exemplified by vinyl, propenyl, allyl, butenyl and isobutenyl. Typically, $R^1$ is a vinyl group.

Examples of unsubstituted monovalent hydrocarbon groups $R^2$ include alkyl groups such as methyl, ethyl, propyl, butyl and octyl; aryl groups such as tolyl, xylyl and phenyl; and aralkyl groups such as phenylethyl and phenylpropyl. Substituted monovalent hydrocarbon groups $R^2$ include those in which, besides carbon and hydrogen, some or all of the hydrogen atoms in the above-mentioned groups are substituted with halogen such as fluorine and chlorine, such as 3-chloropropyl, 2-methyl-3-chloropropyl, chlorophenyl and 3.3.3-trifluoropropyl groups. The number of carbon atoms in these substituted or unsubstituted monovalent hydrocarbon groups generally ranges from 1 to 20.

Specific examples of the siloxane units represented by formula (I) include triorganosiloxane units such as vinyldimethylsiloxane, vinylphenylmethylsiloxane vinyldiphenylsiloxane, and vinylmethyl(3,3,3-trifluoropropyl)siloxane; diorganosiloxane units such as vinylmethylsiloxane, vinylphenylsiloxane and vinyl(3,3,3-trifluoropropyl)siloxane and monoorganosiloxane units such as vinylsiloxane.

Specific examples of the siloxane units represented by formula (II) include $SiO_{4/2}$, diorganosiloxane units such as dimethylsiloxane, methylphenylsiloxane, diphenylsiloxane, methyloctylsiloxane, methyl(3,3,3-trifluoropropyl)siloxane, methyl(3-chloropropyl)siloxane and methyl(2-methyl-3chloropropyl)siloxane; triorganosiloxanes such as trimethylsiloxane, dimethylphenylsiloxane and dimethyl(3,3,3-trifluoropropyl)siloxane; monoorganosiloxanes such as methylsiloxane, propylsiloxane, phenylsiloxane, 3,3,3-trifluoropropylsiloxane, 3-chloropropylsiloxane and 2-methyl-3-chloropropylsiloxane.

Specific examples of the alkenyl group-containing organopolysiloxanes used in this invention are dimethylvinylsiloxy-terminated polydimethylsiloxane, phenylmethylvinylsiloxy-terminated diphenylsiloxy/dimethylsiloxy copolymer polysiloxanes and trimethylsiloxy-terminated methylvinylsiloxy/dimethylsiloxy copolymer polysiloxanes. However, the applicable alkenyl group-containing organopolysiloxanes of this invention are not limited by these examples and can comprise, for example, any combination of two or more of the above-mentioned siloxane units provided that at least two siloxane units having alkenyl functionality are included.

The silicon hydride functional polyorganosiloxane (b) may likewise be any such compound known in the art of hydrosilation cured formulations. Suitably it is an organohydrogenpolysiloxane compound comprising a plurality of siloxane unit having the formula (III)

$$H_c R^3{}_d SiO_{(4-c-d)/2} \qquad (III)$$

wherein $R^3$ is a silicon-bonded substituted or unsubstituted monovalent hydrocarbon group, c has a value of from 1 to 3, preferably 1, d has a value of from 0 to 2 and c+d has a value of from 1 to 3, all values inclusive, any remaining siloxane units in the organohydrogenpolysiloxane having the formula (IV)

$$R^3{}_y SiO_{(4-y)/2} \qquad (IV)$$

wherein $R^3$ is as denoted above and y has a value of from 0 to 3, inclusive. The $R^3$ groups are defined as for the $R^2$ groups of the alkenyl functional polyorganosiloxane and are exemplified by those groups previously listed as examples for $R^2$.

The structure of the organohydrogenpolysiloxane (III) may be linear, branched chain, cyclic or network. The degree of polymerization is two or greater and the upper limit on this is the degree of polymerization at which polymerization remains possible, ordinarily 10,000.

Specific examples of the siloxane units represented by formula (III) include $H(CH_3)_2SiO_{1/2}$, $H(CH_3)(C_6H_5)SiO_{1/2}$, $H(CH_6H_5)SiO_{2/2}$, $H(CH_3CH_2CH_2)SiO_{2/2}$, $H(CH_3)(CF_3CH_2CH_2)SiO_{1/2}$, $H(CH_3)(C_6H_5)SiO_{2/2}$ and $HSiO_{3/2}$.

Specific examples of the siloxane units represented by formula (IV) include those examples delineated above for those siloxane units represented by formula (II).

Specific examples of the organohydrogenpolysiloxanes used in this invention are: dimethylhydrogensiloxy-terminated dimethylsiloxy/methylhydrogensiloxy copolymer polysiloxanes, dimethylhydrogensiloxy-terminated methylphenylsiloxy/methylhydrogensiloxy copolymer polysiloxanes, and cyclic methylhydrogen polysiloxanes. Other examples can be readily recognized by those skilled in the art. Preferably at least 30% and no more than 85% of the siloxane units of the polyorganosiloxane (b) contain silicon hydride functionality.

Generally, component (b) is employed in such a proportion that the amount of hydrogen groups is 0.2 to 5 times greater on an equivalent basis than the amount of alkenyl groups, such as vinyl groups, in component (a). If the proportion of hydrogen groups falls below 0.2-fold on an equivalent basis, curing is insufficient. If it exceeds 5-fold on an equivalent basis, hydrogen gas foaming occurs which interferes with the stability of the curing system.

The hydrosilation reaction catalyst component (c) of the compositions of this invention, are those which are known to be used for hydrosilation. Specific examples include: finely powdered platinum, finely powdered platinum absorbed on a carbon powder support, chloroplatinate, alcohol-modified chloroplatinate, chloroplatinate-olefin complexes, chloroplatinate-vinylsiloxane coordination compounds, platinum black, tetrakis(triphenylphosphine)palladium, palladium black and rhodium catalysts. The amount to be added is the amount which is sufficient for curing the compositions composed of the above-mentioned components (a) and (b). In the case of a platinum catalyst in a homogeneous system, component (c) is used in a weight proportion of 0.1 ppm to 100 ppm, based on the total amount of components (a) and (b). In the case of a catalyst in a heterogeneous system, such as platinum black, it is used preferably in the range of 20 ppm to 1000 ppm on the same basis.

The formulations of the invention are typically prepared as two part compositions which are mixed at the time of use. One part (the "A" part) will suitably comprise the catalyst component (c) and at least a part of the alkenyl functional polyorganosiloxane (a). The second part ("B" part) will suitably comprise the silicon hydride functional polyorganosiloxane (b), optionally with a portion of the alkenyl functional polyorganosiloxane to adjust the two parts to have a similar rheology. Fillers and additives can be compounded in one or both parts of the compositions of this invention in order to reduce thermal shrinkage during the curing process, to reduce the degree of thermal expansion of the elastomer obtained by curing and to improve the thermal stability, weather resistance, chemical resistance, flame retardancy or mechanical strength or to reduce the degree of gas permeation. Examples of these filers and additives are fumed silica, quartz powder, glass fiber, carbon black, alumina, metal oxides such as iron oxide and titanium oxide and metal carbonates such as calcium carbonate and magnesium carbonate.

The adhesion promoter combination (d) comprises as one ingredient a conventional silane adhesion promoter. Examples include 3-methacryloxypropyltrimethoxysilane (MAPTMS), (3-glycidoxypropyl) methyldiethoxysilane (GPMDES), 2-(3,4 epoxycyclohexyl)ethyltrimethoxysilane (EpCyETMS), (3-glycidoxypropyl)-trimethoxysilane (GPTMS), 1-trimethoxysilyl-2(chloromethyl)-phenylethane (ClMPETMS), tetrakis(2-methoxyethoxy)silane (TMES) and trimethoxysilylpropylurea (TMSPU). Preferably the silane adhesion promoter is a silane containing two or three alkoxy groups as well as a group having epoxy, (meth)acryl or urea functionality. The silane adhesion promoter may generally be satisfactorily employed in the A part of the two-part formulation, with the alkenyl silicone (a) and the catalyst (c). However, vinyl functional silanes such as vinyloximinosilane (VOS) or vinyltriethoxysilane (VTES) appear to significantly retard pot-life of the compositions when employed in the first part, apparently because of interference with the catalyst, so that if employed they should be kept in the B part, separate from the catalyst.

The other components of the adhesion promoter mixture, i.e. the diallyl maleate and triallylisocyanurate components, must be formulated in the second "B" part of the composition, separate from the catalyst as they will disrupt the room temperature curing of the formulations if brought into contact with the catalyst before hydrosilation cure is initiated. These additives will affect the pot-life of the mixed formulation but when properly formulated can be employed to give a 1-3 hour pot-life and to simultaneously provide enhanced adhesion to plastic substrates such as polyimide composite materials.

The silane adhesion promoters are suitably employed in the compositions of the invention at a level of 500-5000 ppm, the triallyl isocyanurate at a level of 110-450 ppm and the: diallyl maleate at a level of 70-275 ppm. In a composition formulated for a mixing ratio of 10:1, part A to part B, the silane adhesion promoter is desirably employed in the A part at a level of 750-3000 ppm, preferably about 1500 ppm; the triallyl isocyanurate is suitably employed in the B part at a level of 1200 ppm-5000 ppm, preferably about 2500 ppm; and the diallyl maleate is employed in the B part at a level of 750 ppm-3000 ppm, preferably about 1500 ppm.

When the substrate is a polyimide, further improvements in adhesion of the formulations of the invention to the substrate can be obtained by flame treatment or UV irradiation of the substrate prior to bonding. UV irradiation of polyimides has also been demonstrated to provide adhesion improvement benefits when other hydrosilation cured silicon formulations, such as Pt catalyzed thermally cured formulations, are employed in place of the specific invention formulations. Conventional Hg lamps with predominant output at 365 nm are suitably employed. The radiation dosage may be widely varied. Suitable dosages are, for instance, 0.25–5 min at an intensity of 50–500 mW/cm$^2$, typically about one minute at about 150 mW/cm$^2$.

The invention is illustrated by the following non-limiting examples.

COMPARATIVE EXAMPLES

As a master batch vane dampening compound Loctite VSI V-612 a two part commercial vane dampening compound was employed. This product is formulated without adhesion promoters and is conventionally used on primed surfaces. The mix ratio of the: two parts was 10:1 A to B.

The master batch was used as is as control. Against the control there were compared modified formulations in which various silane adhesion promoters were added to Part A of the master batch formulation at levels indicated in Table 1 below. Panels of 2024 Aluminum, 4910 Titanium and sanded Ultem ™ polyimide/glass fiber composite were wiped with ethanol and bonded using a single stage 16 hour room temperature cure stage after which the bond was broken and inspected for cohesive versus adhesive failure mode. Other panels were subjected to a two stage cure cycle, the first stage being 16 hours at room temperature and the second stage being 1 hour at 150° C., after which the bond failure mode was again inspected. The pot-lives of the mixed compositions and the cup durometer (Shore A) hardness of the cured compositions were also measured. Results are shown in Table 1 where 1/xx; 2/yy designates, respectively, the measured value of xx after single stage room temperature cure and the measured value of yy after two stage room temperature/150° C. cure; NC=not cured; NA=not available; SL=slight cure; and T=tacky.

TABLE 1

| Component (ppm) | Pot Life | Shore A Cup Dur. | % Cohesive Failure | | |
|---|---|---|---|---|---|
| | | | Al Panels | Ti Panels | Sanded Polyimide |
| Control (0) | 1 Hr 30 Min | 1/50; 2/63 | 1/0; 2/0 | 1/0; 2/0 | 1/0; 2/0 |
| VTES (750) | 3 Hr | 1/44; 2/55 | 1/0; 2/30 | 1/0; 2/7 | 1/0; 2/0 |
| VTES (1500) | 4 Hr 10 Min | 1/45; 2/57 | 1/0; 2/70 | 1/0; 2/99 | 1/0; 2/0 |
| VTES (2250) | 5 Hr | 1/42; 2/58 | 1/0; 2/70 | 1/0; 2/90 | 1/0; 2/0 |
| VTES (3000) | 4 Hr | 1/42; 2/57 | 1/0; 2/50 | 1/0; 2/10 | 1/0; 2/0 |
| MAPTMS (750) | 1 Hr 30 Min | 1/54; 2/61 | 1/0; 2/80 | 1/0; 2/25 | 1/0; 2/0 |
| MAPTMS (1500) | 1 Hr 30 Min | 1/46, 2/63 | 1/0; 2/85 | 1/0; 2/10 | 1/0; 2/0 |
| MAPTMS (2250) | 1 Hr 50 Min | 1/32; 2/64 | 1/0; 2/95 | 1/0; 2/25 | 1/0; 2/0 |
| MAPTMS (3000) | 2 Hr | 1/SL; 2/NA | 1/T; 2/90 | 1/0; 2/60 | 1/T; 2/0 |
| GPMDES (750) | 1 Hr 15 Min | 1/52; 2/61 | 1/0; 2/50 | 1/0; 2/0 | 1/0; 2/0 |
| GPMDES (1500) | 1 Hr 10 Min | 1/50, 2/61 | 1/0; 2/80 | 1/0; 2/0 | 1/0; 2/0 |
| GPMDES (2250) | 1 Hr 10 Min | 1/52; 2/57 | 1/0; 2/15 | 1/0; 2/0 | 1/0; 2/0 |
| GPMDES (3000) | 1 Hr 15 Min | 1/53; 2/64 | 1/0; 2/60 | 1/0; 2/0 | 1/0; 2/0 |
| EpCyETMS (750) | 1 Hr 10 Min | 1/52; 2/63 | 1/0 2/80 | 1/0; 2/O | 1/0, 2/0 |
| EpCyETMS (1500) | 1 Hr | 1/52; 2/61 | 1/0; 2/80 | 1/0; 2/0 | 1/0; 2/0 |

TABLE 1-continued

| | | | % Cohesive Failure | | |
|---|---|---|---|---|---|
| Component (ppm) | Pot Life | Shore A Cup Dur. | Al Panels | Ti Panels | Sanded Polyimide |
| EpCyETMS (2250) | 1 Hr | 1/50; 2/63 | 1/0; 2/90 | 1/0; 2/0 | 1/0; 2/0 |
| EpCyETMS (3000) | 1 Hr 10 Min | 1/52; 2/63 | 1/0; 2/50 | 1/0; 2/0 | 1/0; 2/0 |
| TMSPU (750) | 50 Min | 1/46; 2/63 | 1/0; 2/55 | 1/0; 2/40 | 1/0; 2/0 |
| TMSPU (1500) | 55 Min | 1/37; 2/61 | 1/0; 2/80 | 1/0; 2/90 | 1/0; 2/0 |
| TMSPU (2250) | 55 Min | 1/38; 2/58 | 1/0; 2/90 | 1/A; 2/80 | 1/0; 2/0 |
| TMSPU (3000) | 55 Min | 1/36; 2/58 | 1/0; 2/75 | 1/A; 2/80 | 1/0; 2/0 |
| GPTMS (750) | NA | NA | 1/0; 2/90 | 1/0; 2/0 | 1/0; 2/0 |
| GPTMS (1500) | 1 Hr 30 Min | NA | 1/0; 2/98 | 1/0; 2/2 | 1/0; 2/0 |
| GPTMS (2250) | NA | NA | 1/0; 2/98 | 1/0; 2/75 | 1/0; 2/0 |
| GPTMS (3000) | 1 Hr 45 Min | NA | 1/0; 2/97 | 1/0; 2/45 | 1/0; 2/0 |
| ClMPETMS (750) | 1 Hr 10 Min | 1/45; 2/58 | 1/0; 2/30 | 1/0; 2/99 | 1/0; 2/0 |
| ClMPETMS (1500) | 1 Hr 15 Min | 1/45; 2/61 | 1/0; 2/3 | 1/0; 2/45 | 1/0; 2/0 |
| ClMPETMS (2250) | 1 Hr | 1/48; 2/57 | 1/0; 2/10 | 1/0; 2/75 | 1/0; 2/0 |
| ClMPETMS (3000) | 1 Hr | 1/45; 2/57 | 1/0; 2/5 | 1/0; 2/80 | 1/0; 2/0 |
| TMES (750) | 1 Hr 30 Min | 1/45; 2/64 | 1/0; 2/60 | 1/0; 2/96 | 1/0; 2/0 |
| TMES (1500) | 1 Hr 25 Min | 1/44; 2/63 | 1/0; 2/47 | 1/0; 2/80 | 1/0; 2/0 |
| TMES (2250) | 1 Hr 40 Min | 1/44; 2/65 | 1/0; 2/60 | 1/0; 2/98 | 1/0; 2/0 |
| TMES (3000) | 2 Hr | 1/42; 2/63 | 1/0; 2/85 | 1/0; 2/80 | 1/0; 2/0 |
| TMES (500) | N/A | 1/51; 2/65 | 1/0; 2/5 | 1/0; 2/90 | 1/0; 2/0 |

The results show that while most of the screened silanes gave significant improvement on aluminum panels and some gave reasonable adhesion to titanium, none were effective to improve the level of cohesive failure on the polyimide substrate.

Triallyl isocyanurate and diallyl maleate at the 1500 ppm level in Part A of the same master batch formulation gave about 10% cohesive failure on sanded unprimed Ultem panels after curing for 1 hour at 150° C. However, those formulations would not provide a room temperature cure.

EXAMPLE 1

Formulations of the invention were prepared to provide pot life and hardness properties similar to the control but employing a combination of adhesion promoters including glycidoxypropyltrimethoxysilane, triallyl isocyanurate and diallyl maleate.

The A part for both formulations had the following composition:

| | |
|---|---|
| Vinyl terminated PDMS (Pt catalyst included) | 38.35 |
| Vinyl resinated PDMS (Pt catalyst included) | 23.3 |
| Hydrophobic treated silica | 18.1 |
| Fumed silica -hydrophilic | 0.1 |
| Polyglycol | 0.1 |
| Crystalline silica 5μ | 19.9 |
| 3-glycidoxypropyltrimethoxysilane | 0.15 | approximately 15 ppm Pt in total composition

Two B portions were prepared containing the following ingredients:

| Ingredients | B1 Parts by Weight | B2 Parts by Weight |
|---|---|---|
| 65% Carbon Black/35% non-reactive silicone fluid | 12.0 | 12.0 |
| 50/50 Dimethylsiloxane/methyl-hydrogensiloxane copolymer Masil TM 273-147 (PPG Industries) | 44.0 | 35.0 |
| Crystalline silica - 5μ | 12.0 | 12.0 |
| Vinyl-terminated polydimethylsiloxane Baysilone polymer U-10 (Miles) | 31.65 | — |
| Vinyl resinated polydimethylsiloxane Baysilone RTV AC 3075 (Miles) | — | 40.65 |
| Triallyl isocyanurate | 0.25 | 0.25 |
| Diallyl maleate | 0.15 | 0.15 |
| | 100.0 | 100.0 |

Formulation 1 was a 10:1 mixture of the A part and the B1 part. Formulation 2 was a 10:1 mixture of the A part and the B2 part. Typical measured properties are indicated below where RT cure is 16 hours at ambient and full cure is 16 hours at ambient followed by 1 hour at 150° C.

| Property | Formulation 1 | Formulation 2 |
|---|---|---|
| Working Life | 2.5 Hrs. | 1.25 Hrs. |
| Specific Gravity | 1.26 | 1.26 |
| Tensile Strength (ASTM D-412) | 823 psi | 978 psi |
| Elongation | 110% | 152% |
| Shore A hardness (RT cure) | 53 | 49 |
| Shore A hardness (Full cure) | 67 | 69 |
| Lap Shear (Full cure Al panel) | 478 psi | 792 psi, |
| Cohesive failure (Al panel) | 99% | 100% |

EXAMPLE 2

Panels of three different aluminum alloys and one titanium alloy were scrubbed with isopropyl alcohol using a non-woven polymer dishwashing pad and then wiped with isopropyl alcohol. Formulation 2 from the previous example was used to bond the panels. Lap shear tensile strength and cohesive failure were determined after a two stage cure as in the previous example. Results are shown in Table 2:

TABLE 2

| PANEL | Lap Shear | Cohesive Failure |
|---|---|---|
| 2024 Al | 792 psi | 100% |
| 4037 Al | 664 psi | 100% |
| 4045 Al | 699 psi | 99% |
| 4910 Ti | 727 psi | 99% |

EXAMPLE 3

Unsanded Ultem ™ panels were processed as indicated in Table 4 and bonded with the invention Formulation 2 as described in Example 1. Results of lap shear and cohesive failure testing are given in Table 3.

TABLE 3

| Treatment | Lap Shear | Cohesive Failure |
|---|---|---|
| No flame (control) | 239 psi | 50%* |
| Primed** | 708 psi | 99% |
| Oxyacetylene flame, 1 pass | 678 psi | 99% |
| Propane flame, 1 pass | 727 psi | 99% |

*Based on visual inspection of broken bond for exposed substrate. In this particular case, however, most of the cohesively failed adhesive was readily peelable from the substrate.
**Primer was Loctite VSI V-06R.

When 1-pass propane flame treated Ultem ™ panels were subjected to delay intervals of up to 24 hours before bonding with Formulation 2 of Example 1, lap shear strengths in excess of 625 psi and cohesive failure of greater than 95% were still obtained.

EXAMPLE 4

Unprimed Ultem ™ polyimide composite panels were cleaned as indicated in Table 4, irradiated with 365 nm UV irradiation for one minute at an intensity of 150 mW/cm$^2$ and bonded with the Control formulation of the comparative examples or the invention Formulation 2 of Example 1. Results of lap shear and cohesive failure testing are given in Table 4.

TABLE 4

| Sample | Cleaning | Lap Shear | Cohesive Failure |
|---|---|---|---|
| Control | Sanded & wiped with isopropanol | 291 psi | ~1% |
| Formulation 2 | Sanded & wiped with isopropanol | 730 psi | 99% |
| Formulation 2 | None | 586 | 99% |

With sanded and isopropanol wiped panels, irradiation dosages as low as 50 mW/cm$^2$ for 30 sec gave lap shear strengths at least 540 psi and cohesive failure in excess of 90%.

EXAMPLE 5

This example demonstrates that polyimide substrates pretreated by UV irradiation also give improved bonding with other hydrosilation curable silicone formulations.

Compositions were prepared as follows:

| Composition 1 | |
|---|---|
| 1000 cps α,ω-divinyl polydimethylsiloxane | 9.0% |
| 500 cps α,ω-dihydride polydimethylsiloxane | 14.3 |
| 40 cps polydimethylsiloxane containing 4.3% SiH | 0.5 |
| platinum-silicone complex | 0.1 |
| 2-methyl-butyn-2-ol | 0.1 |
| fumed silica | 1.0 |
| 325 Mesh calcined alumina | 75.0 |

| Composition 2 | |
|---|---|
| 10,000 cps α,ω-divinyl polydimethylsiloxane | 39.6% |
| 40 cps polydimethylsiloxane containing 4.3% SiH | 1.1 |
| Platinum-silicone complex | 0.1 |
| 2-methyl-3-butyn-ol | 0.1 |

| Composition 2 (continued) | |
|---|---|
| Fumed silica | 11.8 |
| 325 Mesh calcined alumina | 47.1 |
| 3-glycidoxypropyltrimethoxysilane | 0.2 |

The compositions were used to bond glass fiber reinforced polyimide rings to glass collars. Composition 1 was used to mate the two parts and cured 30 minutes at 125° C. The assemblies were cooled to room temperature and then the rings were twisted off with a calibrated torque wrench equipped with a ½" bolt extractor bit. The values recorded were the maximum torque at failure. The assemblies tested with composition 2 were cured 20 minutes at 121° C., cooled, and tested with an automatic torque device. Treated rings were exposed to about 2 J/cm$^2$ of UV radiation from a medium pressure mercury arc lamp in a forced air ventilated cabinet.

| | Results | |
|---|---|---|
| | Untreated polyimide | Treated polyimide |
| Composition 1 | 48 ft-lb | 140 ft-lb |
| Composition 2 | 82 ft-lb | 190 ft-lb |

What is claimed is:

1. In a room-temperature vulcanizable silicone formulation which comprises:
   (a) a polyorganosiloxane having plural alkenyl groups thereon;
   (b) a polyorganosiloxane having plural silicon hydride groups thereon; and
   (c) a hydrosilation catalyst, the improvement wherein the formulation further comprises:
   (d) a combination of adhesion promoting compounds containing at least one silane adhesion promoter compound at a level of 500–5000 ppm, triallyl isocyanurate at a level of 110–450 ppm, and diallyl maleate at a level of 70–275 ppm, based on total composition weight.

2. A formulation as in claim 1 wherein said alkenyl groups of said polyorganosiloxane (a) are selected from the group consisting of vinyl, propenyl, allyl, butenyl and isobutenyl.

3. A formulation as in claim 1 wherein said polyorganosiloxane (a) contains at least two siloxane units selected from the group consisting of vinyldimethylsiloxane, vinylphenylmethylsiloxane, vinyldiphenylsiloxane, vinylmethyl(3,3,3-trifluoropropyl)siloxane, vinylmethylsiloxane vinylphenylsiloxane vinyl(3,3,3-trifluoropropyl)siloxane and vinylsiloxane.

4. A formulation as in claim 1 wherein at least 30% and no more than 85% of the siloxane units of the polyorganosiloxane (b) contain silicon hydride functionality.

5. A formulation as in claim 4 wherein said silicon hydride containing siloxane units are selected from the group consisting of $H(CH_3)_2SiO_{1/2}$, $H(CH_3)(C_6H_5)SiO_{1/2}$, $H(CH_6H_5)SiO_{2/2}$, $H(CH_3CH_2CH_2)SiO_{2/2}$, $H(CH_3)(CF_3CH_2CH_2)SiO_{1/2}$, $H(CH_3)(C_6H_5)SiO_{2/2}$ and $HSiO_{3/2}$.

6. A formulation as in claim 1 in the form of a two part composition, the first part (A) comprising the catalyst component (c), the silane adhesion promoter and at least a portion of alkenyl functional polyorganosiloxane (a), and the second part (B) comprising the silicon hydride functional polyorganosiloxane (b), the remaining portion of the alkenyl functional polyorganosiloxane (a) and at least the triallyl isocyanurate and diallyl maleate components of the combination (d) of adhesion promoting compounds.

7. In a room-temperature vulcanizable silicone formulation which comprises:
   (a) a polyorganosiloxane having plural alkenyl groups thereon;
   (b) a polyorganosiloxane having plural silicon hydride groups thereon; and
   (c) a hydrosilation catalyst, the improvement wherein the formulation further comprises:
   (d) a combination of adhesion promoting compounds containing at least one silane adhesion promoter compound, triallyl isocyanurate, and diallyl maleate;
   the formulation being in the form of a two part composition, the first part (A) comprising the catalyst component (c), the silane adhesion promoter and at least a portion of the alkenyl functional polyorganosiloxane (a), and the second part (B) comprising the silicon hydride functional polyorganosiloxane (b), the remaining portion of the alkenyl functional polyorganosiloxane (a) and at least the triallyl isocyanurate and diallyl maleate components of the combination (d) of adhesion promoting compounds; the two part composition being formulated for a mixing ratio of 10:1, part A to part B, wherein the silane adhesion promoter is employed in the A part at a level of 750–3000 ppm; the triallyl isocyanurate is employed in the B part at a level of 1200 ppm–5000 ppm; and the diallyl maleate is employed in the B part at a level of 750 ppm–3000 ppm.

8. A two part composition as in claim 7 wherein the level of silane adhesion promoter is about 1500 ppm, the level of triallyl isocyanurate is about 2500 ppm, and the level of diallyl maleate is about 1500 ppm.

9. A two part composition as in claim 8 wherein the silane adhesion promoter is selected from the group consisting of 3-methacryloxypropyltrimethoxysilane, (3-glycidoxypropyl)methyldiethoxysilane, 2-(3,4-epoxycyclohexyl)ethyltrimethoxysilane, (3-glycidoxypropyl)trimethoxysilane, 1-trimethoxysilyl-2(chloromethyl)-phenylethane, tetrakis(2-methoxyethoxy)silane and trimethoxysilylpropylurea.

10. A formulation as in claim 1 further characterized by a room temperature pot life of 1–3 hours.

11. A formulation as in claim 1 wherein the silane adhesion promoter is a silane having two or three alkoxy groups and a group having epoxy, (meth)acryl or urea functionality.

12. A formulation as in claim 11 wherein the silane adhesion promoter is (3-glycidoxypropyl)trimethoxysilane.

13. A method for making an assembly of a silicone polymer bonded to a substrate comprising:
   applying a formulation to said substrate without first applying a primer to the substrate, the formulation being a room-temperature vulcanizable silicone formulation which comprises:
   (a) a polyorganosiloxane having plural alkenyl groups thereon;
   (b) a polyorganosiloxane having plural silicon hydride groups thereon; and
   (c) a hydrosilation catalyst, the improvement wherein the formulation further comprises:
   (d) a combination of adhesion promoting compounds including at least one silane adhesion promoter compound at a level of 500–5000 ppm, triallyl isocyanurate at a level of 110–450 ppm, and diallyl maleate at a level of 70–275 ppm, based on total composition weight;
   curing the formulation at ambient temperature for a period of at least 10 hours; and
   subsequently heating the assembly to a temperature of at least 100° C.

14. A method as in claim 13 wherein said substrate comprises aluminum or an alloy thereof.

15. A method as in claim 13 wherein said substrate comprises titanium or an alloy thereof.

16. A method as in claim 13 wherein said substrate comprises a polyimide polymer.

17. A method as in claim 16 wherein the polyimide is flame treated before said applying step.

18. A method as in claim 16 wherein the polyimide is irradiated with UV radiation before said applying step.

19. A method as in claim 13 wherein said substrate comprises a vane of a jet engine and said silicone polymer is applied as a vibration dampener.

20. A method as in claim 19 wherein the formulation is prepared by mixing a two part composition; the first part (A) of the composition comprising the catalyst component (c) and at least a portion of the alkenyl functional polyorganosiloxane (a), and the second part (B) of the composition comprising the silicon hydride functional polyorganosiloxane (b) and at least the triallyl isocyanurate and diallyl maleate components of the combination (d) of adhesion promoting compounds; the composition formulated for a mixing ratio of 10:1, part A to part B; the silane adhesion promoter is employed in the A part at a level of 750–3000 ppm; the triallyl isocyanurate is employed in the B part at a level of 1200 ppm–5000 ppm; the diallyl maleate is employed in the B part at a level of 750 ppm–3000 ppm; and the silane adhesion promoter is selected from the group consisting of 3-methacryloxypropyltrimethoxysilane, (3-glycidoxypropyl)methyldiethoxysilane, 2-(3,4-epoxycyclohexyl)ethyltrimethoxysilane, (3-glycidoxypropyl)trimethoxysilane, 1-trimethoxysilyl-2(chloromethyl)-phenylethane, tetrakis(2-methoxyethoxy)silane and trimethoxysilylpropylurea.

21. In a method for making an assembly of a cross-linked silicone polymer bonded to a polyimide substrate, the method comprising applying a formulation as in claim 1 to the polyimide substrate and curing the formulation, the improvement wherein the polyimide substrate is irradiated with UV radiation prior to said applying step.

22. A formulation as in claim 1 in the form of a two part composition, the first part (A) comprising the catalyst component (c) and at least a portion of the alkenyl functional polyorganosiloxane (a), and the second part (B) comprising the silicon hydride functional polyorganosiloxane (b), the remaining portion of the alkenyl functional polyorganosiloxane (a), the silane adhesion promoter and at least the triallyl isocyanurate and diallyl maleate components of the combination (d) of adhesion promoting compounds.

23. A two part composition as in claim 22 wherein the silane adhesion promoter is a vinyl functional silane.

* * * * *